(12) United States Patent
Levi et al.

(10) Patent No.: US 8,045,581 B2
(45) Date of Patent: Oct. 25, 2011

(54) PROTOCOL FOR NATIVE SERVICE TRANSPORT OVER POINT-TO-MULTIPOINT PASSIVE OPTICAL NETWORKS

(75) Inventors: David Levi, Shoham (IL); David Ivancovsky, Maccabim (IL)

(73) Assignee: Broadlight, Ltd., Herzliya (IL)

( * ) Notice: Subject to any disclaimer, the term of this patent is extended or adjusted under 35 U.S.C. 154(b) by 475 days.

(21) Appl. No.: 12/107,975

(22) Filed: Apr. 23, 2008

(65) Prior Publication Data

US 2009/0323715 A1   Dec. 31, 2009

Related U.S. Application Data

(63) Continuation of application No. 10/468,025, filed as application No. PCT/IL02/00120 on Feb. 17, 2002, now Pat. No. 7,376,144.

(30) Foreign Application Priority Data

Feb. 21, 2001   (IL) .......................................... 141578

(51) Int. Cl.
*H04J 3/16* (2006.01)

(52) U.S. Cl. ........................................ 370/468; 370/458

(58) Field of Classification Search .................. 370/235, 370/236, 337, 395, 395.43, 432, 442–444, 370/458, 459, 470–473; 709/223; 359/135, 359/168; 380/274, 278; 395/200.33, 200.53
See application file for complete search history.

(56) References Cited

U.S. PATENT DOCUMENTS

| | | |
|---|---|---|
| 5,173,899 A | 12/1992 | Ballance |
| 5,453,988 A | 9/1995 | Clarke |
| 5,509,003 A | 4/1996 | Snijders et al. |
| 5,570,355 A | 10/1996 | Dail et al. |
| 5,648,958 A | 7/1997 | Counterman |

(Continued)

FOREIGN PATENT DOCUMENTS

WO      97 45972      12/1997

OTHER PUBLICATIONS

ITU-T Recommedation G.983.1 (Oct. 1998), Series G: Transmission System and Media, Digital Systems and Networks, Broadband optical access systems based on Passive Optical Networks (PON), cover page, pp. i-v and 26-28. Due to the sheer volumn of this document, only a few relevant pages are reproduced. Hard-copy document avaible upon request.*

ITU-T Recommedation G.983.1 (Oct. 1998), Series G: Transmission System and Media, Digital Systems and Networks, Broadband optical access systems based on Passive Optical Networks (PON), cover page, pp. i-v and pp. 1-110.*

(Continued)

*Primary Examiner* — Andrew Lai
(74) *Attorney, Agent, or Firm* — Myers Wolin, LLC

(57) ABSTRACT

A method for information transfer allowing for native transfer of voice, data, and any other digital service information over a passive optical network, comprising; the LT transmitting downstream in serially ordered frames broadcast to all of the NT's at a fixed interval; the NT's transmitting upstream in serially ordered frames, said frames being divided into serially ordered time slots, at most one NT transmitting information for at most one service type in each slot; the LT and the NT's exchanging management information, and the LT and the NT's natively transporting service information to each other in both the upstream and downstream directions, according to said management information exchanged between the LT and the NT's.

21 Claims, 1 Drawing Sheet

U.S. PATENT DOCUMENTS

| | | | |
|---|---|---|---|
| 5,754,555 A | 5/1998 | Hurme et al. | |
| 5,774,668 A * | 6/1998 | Choquier et al. | 709/223 |
| 5,790,522 A * | 8/1998 | Fichou et al. | 370/236 |
| 5,978,374 A * | 11/1999 | Ghaibeh et al. | 370/395.43 |
| 6,249,526 B1 * | 6/2001 | Loukianov | 370/442 |
| 6,914,909 B2 | 7/2005 | Van De Voorde et al. | |
| 7,031,343 B1 * | 4/2006 | Kuo et al. | 370/473 |
| 2001/0005376 A1 * | 6/2001 | Van De Voorde et al. | 370/442 |
| 2002/0021472 A1 * | 2/2002 | Nakaishi | 359/168 |
| 2002/0110245 A1 * | 8/2002 | Gruia | 380/278 |

OTHER PUBLICATIONS

Dail et al; "Adaptive Digital Access Protocol: A MAC Protocol for Multiservice Broadband Access Networs"; IEEE Communications Magazine, vol. 34, No. 3, Mar. 1996, pp. 104-112, XP000557382.

"Broadband Optical Access Systems Based on Passive Optical Networks (PON)" ITU-T Recommendation G.983.1, Oct. 1998, pp. 1-118.

* cited by examiner

PROTOCOL FOR NATIVE SERVICE TRANSPORT OVER POINT-TO-MULTIPOINT PASSIVE OPTICAL NETWORKS

This application is a continuation of U.S. application Ser. No. 10/468,025, filed Dec. 5, 2003, now U.S. Pat. No 7,376,144, which is the National Stage of International Application No. PCT/IL02/00120, filed Feb. 17, 2002, which claims priority from an Israeli application No. 141578 filed Feb. 21, 2001, each of which are herein incorporated by reference.

FIELD OF THE INVENTION

The present invention generally relates to the field of high-speed data communication. More specifically, the present invention relates to the field of communication over passive optical networks (PON). The present invention relates to the use of such networks for the native transport of IP and ATM data, as well as voice, and any other service.

DEFINITION OF TERMS USED IN THE INVENTION

In this invention, the following terms are used according to their definitions here.

ATM—Asynchronous Transfer Mode. A protocol for service transfer in which data is sent in 53 byte cells, the first of which comprise a header, and are followed by a 48 byte payload. ATM is the standard used by telecommunications company backbones.

Churning—A basic encryption mechanism used to encrypt broadcast downstream data in a PON. Each Network termination (NT) has a different churning key, used for decrypting data intended for it. Churning offers the basic level of protection for data security in a PON, and is necessary because every NT receives all of the downstream data.

Downstream—The direction of flow from the (Line Termination) (LT) to the NT's.

DSP—Digital Signal Processor. A specialized processor for real-time processing. DSP's are typically engineered to perform a particular function.

Filtering—The method by which each NT determines which downstream service information is intended for it.

HEC—Header Error Control. Algorithm for checking and correcting errors in service transmission headers.

IP—Internet Protocol. A protocol for service transfer in which data is sent in variable length packets, containing a header with addressing, type-of-service specification, fragmentation and reassembly, and security information.

LAN—Local Area Network. A user-side data network for providing individual user's with data access by way of a single gateway to the Internet (in this case the NT).

LT—Line Termination. The network-side interface of the PON. The LT is connected to the backbone lines for service transport of voice, IP data, ATM data, and optionally other forms of data. This is sometimes referred to as the head end of the PON.

NT—Network termination. The user-side interface of the PON. The NT is connected to the user's internal infrastructure for service transport, such a PBX for voice transport and a LAN for data transport. This is sometimes referred to as the user end of the PON.

PBX—Private Business exchange. A telephone system used for routing and managing voice calls in a business.

PCM—Pulse Code Modulation. Digital transmission of analog voice information through sampling and encoding the samples using a fixed number of bits.

PON—Passive optical network. A point-to-multipoint network in which a single LT broadcasts downstream data to multiple NT's, and each NT communicates with the LT in the upstream direction using TDMA methods. Transport lines are split using passive optical methods only.

PPP—Point-to-Point Protocol. A low-level networking protocol.

TDMA—Time Division Multiple Access. An upstream transmission technique common in point-to-multipoint networks, in which said upstream transmission is coordinated according to time-slots assigned by the LT, in which each time slot contains the transmission of a single NT.

Upstream—The direction of flow from the NT's to the LT.

BACKGROUND OF THE INVENTION

A high-speed access system provides an efficient way for a relatively large number of small-scale users to share a high-speed network. It concentrates several service traffic streams to a single point of entry to a high-speed backbone so as to share the broadband service economically. A PON, or passive optical network, is one such system. PON's have gained in popularity because of their capability to supply a high bandwidth at low cost, due to the fact that the splits between lines are of a purely optical and passive nature. PON's have the potential to supply a full range of all currently known and new services being offered and considered for residential and business customers, over a single line. The most common services today are voice and data, where data is transported using IP or ATM protocols.

The use of a PON requires an efficient multiplexing function to manage the mixed upstream service traffic from the multiple users, or NT's, at the connection point to the network, or the LT. Such a protocol is necessary to prevent collisions between the many information transport streams competing for access to the backbone networks through the single LT.

Related art provides for a method of service transport over a PON, using ATM protocols for transfer of all service types. This is called APON. U.S. Pat. No. 5,978,374 and the International Telecommunications Union standard G.983 relate to APON protocols.

This art is a rather cumbersome way to provide service transport over a PON, as all information being transported must be wrapped in ATM cells at one end, and unwrapped at the other. This wrapping and unwrapping requires a significant amount of work, as well as adding significant overhead because of the addition of ATM headers, which is a drain on bandwidth resources. Furthermore, because of the nature of certain synchronous services, such as voice calls, much of this ATM conversion must be done in real-time, requiring the installation of DSP's at all of the network terminations. Such extensive deployment of DSP's raises costs for service providers. A further disadvantage of the prior art is that the need to convert everything to ATM cells increases the potential for jitter.

Alternatively, according to the prior art many businesses rely on separate suppliers for each of their service needs, most notably voice and data, in order to provide native transport of both. This leads to a situation in which such enterprises are dependent on two or more separate technologies provided by two or more separate suppliers, lowering efficiency and raising costs to the business.

It would be desirable to supply all existing and future services over a single line, using native service transport.

SUMMARY OF THE INVENTION

The present invention provides a method for native service transport over passive optical networks. The present invention provides a means for supplying a customer with voice and data services over a single line, through a single supplier, without the disadvantage of having to convert all services into a single service type at the transmitting end, and then having to convert them back to their original service type at the receiving end.

In accordance with a general aspect of the invention, service information is broadcast in the downstream direction by the LT to all of the NT's, in 125 microsecond frames.

Because all information sent downstream is broadcast to all of the NT's, it is necessary to encrypt downstream transmissions, with the exception of transmissions intended for all of the NT's. In the preferred embodiment of the present invention this encryption is done using churning, a method known to those skilled in the art. Other encryption methods can also be used with the present invention.

Downstream service information is broadcast in blocks. Each block is preceded by a block header containing the block's type of service, length, and bits used for error checking and synchronization between the LT and the NT's. The length of each block is dynamically set by the LT according to the priorities of each service type and the amount of incoming information for each service. Service type priorities according to the present invention are configurable. Synchronous services such as voice will typically have higher priorities than asynchronous services such as data.

All downstream information for a particular service type is broadcast in one block, regardless of which NT is its destination. Existing methods known to those skilled in the art are used to filter downstream service information, with the exception of voice, which is filtered according to a map of time slots distributed from the LT to the NT's at regular, frequent intervals. This map does not need to be transmitted in every frame, so long as it is transmitted with sufficient frequency to provide real-time updates reflecting any changes in the call-to-time-slot mapping, caused by new calls or termination of old calls. Voice service is the highest priority service according to an aspect of the present invention, in the downstream and upstream directions, and in a preferred embodiment is always guaranteed to receive sufficient bandwidth to transfer all calls without any interruption or interference from the PON, defined as the transmission of 8 bits per 125 microsecond frame.

Each downstream frame contains a "PLOAM" block ("Physical Layer Operations, Administration, Management) containing synchronization information, error-checking mechanisms, and a map of grants according to which the NT's will receive permission to transmit in the upstream direction. A grant allocates an upstream timeslot to a particular NT for transmission of a particular service type.

Additional management information is defined as a management service type, and is broadcast downstream as a standard service type, with a standard block header, according to the need. This management service type information sent from the LT to the NT's consists of messages used for distributing and changing encryption keys; notifying the NT's of the status of the LT and its ability to broadcast service information; synchronizing the NT's with the LT; assigning logical addresses to NT's initialized on the network, for use in the downstream service filtering process; and error-checking and verifying the integrity of transmitted data. The map of downstream voice timeslots is also part of the management service information.

In the upstream direction individual NT's transmit service information in a TDMA manner, where each NT knows when it should transmit what service type according to the grant map distributed by the LT in the PLOAM block. Upstream frames are divided into slots of fixed length, which are configurable on initialization of the LT. A given NT transmits all of its information for a given service in consecutive slots, where the first slot in the series starts with a 3-byte header whose role is to provide enough distance between consecutive slots to prevent collisions, and to assist in synchronization between the NT and the LT.

In the upstream direction there is no requirement that all service types from a given NT must be transmitted consecutively, or that all information for a particular service across all NT's must be transmitted consecutively, with the exception of voice. All upstream voice information from all NT's is sent in a consecutive series of slots. Within this series of slots, each NT transmits a 3-byte header as described above, followed by all of its voice service information consecutively, at a rate of 8 bits per frame per call. Once every constant number of frames, at the end of its voice service information, each NT transmits a fixed number of bits reporting to the LT its queue length for each service type. Based on this data and the priority configured for each service, the LT allocates the upstream grants. The frequency at which this queue information is transmitted is configurable.

A management service type exists in the upstream directions as well. Each NT uses this service to send management messages to the LT as needed. Such management messages include the maintenance status of each NT and its ability to transmit in the upstream direction, acknowledgements of reception of downstream management messages, and initialization information when an NT is added to the network or removed from it.

Each NT sends the LT a map of the upstream voice service information, letting the LT know which 8 bits within that NT's voice service sub-slot are for which call. This map does not need to be transmitted in every frame, so long as it is transmitted with sufficient frequency to provide real-time updates reflecting any changes in the call-to-time-slot mapping, caused by new calls or termination of old calls. The NT transmits this map as part of the upstream management service information.

DETAILED DESCRIPTION OF THE PREFERRED EMBODIMENTS

Figure 1:
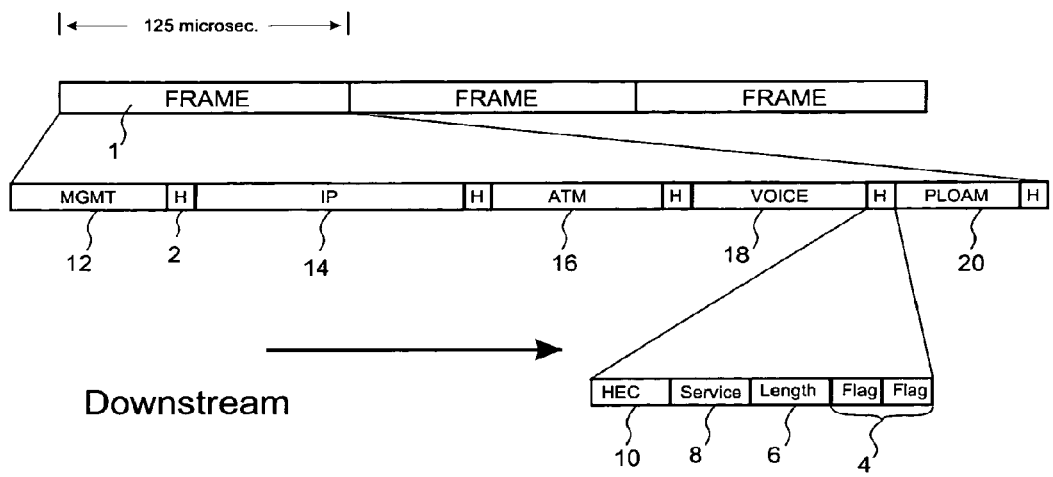
FIG. 1 illustrates an exemplary composition of the downstream frames.
Figure 2:
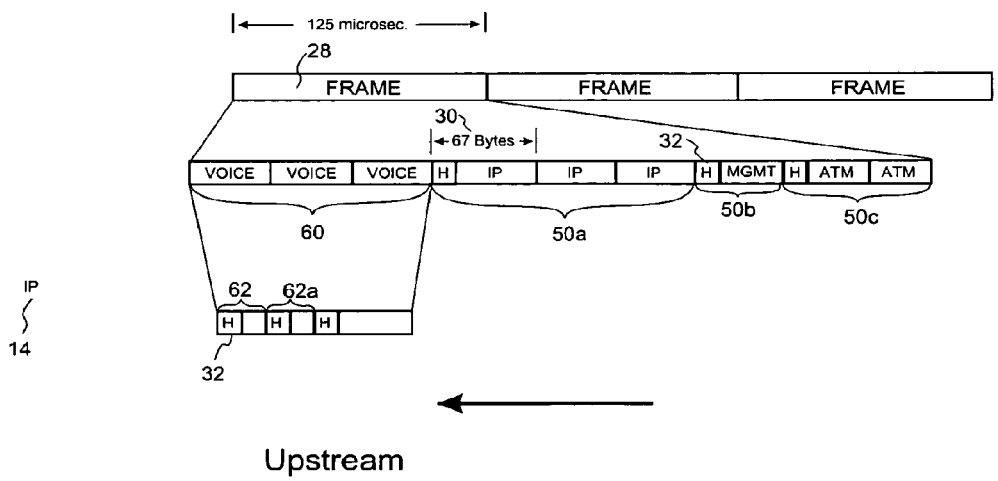
FIG. 2 illustrates an exemplary composition of the upstream frames.

In a preferred embodiment according to the present invention, both the LT and the NT's transmit bits at a rate of 622.08 million bits per second (mpbs), divided into frames of 125 microseconds (1). Alternative embodiments may transmit at 155 mbps, or any other bandwidth desired.

In the downstream direction the LT broadcasts all service information, such that each NT receives all of the information. In a preferred embodiment a method known to those skilled in the art called churning is used to encrypt downstream data to protect service information intended for one NT from being read by others. In alternative embodiments of the current invention other data protection methods may be used, or no protection may be used at all.

In each downstream frame (1) the LT broadcasts all information of a given service type together, in one block. In a preferred embodiment the LT broadcasts a 5-byte header (2) before each service block. This header comprises a one byte double flag (4) to indicate to the NT's the start of a service block, and to assist in synchronization between the LT and the NT's, two bytes indicating the length of the service block (6), one byte indicating the block's service type (8), and a one byte HEC (10) for error-checking the contents of this header.

After broadcasting the header, the LT broadcasts the service information itself. In a preferred embodiment methods have been developed for filtering voice, management information, IP packet, and ATM cell service types. This should not be construed, however, to imply that the present invention is limited to the transport of these service types.

The LT broadcasts management information as a management service type, in a management service type block 12. The LT broadcasts the management block (12) whenever it is needed. The management block (12) comprises management messages, each of which is assigned has a unique ID. Each management message is 13 bytes long, and comprises a one byte destination address field, a one byte management message ID, 10 bytes of management information, and a one byte error correction field. NT's filter the management service type according to the NT address field, and delineate between management messages according to their fixed length. In a preferred embodiment the LT never fragments management messages; only whole management messages are broadcast. In a preferred embodiment the LT sends management messages to distribute and change encryption keys; to notify the NT's of the maintenance status of the LT and its ability to broadcast service information; to synchronize the NT's with the LT; to assign logical addresses to NT's initialized on the PON; and to error-check and verify the integrity of transmitted data.

In a general aspect of the preferred invention the LT regularly sends a management message containing a map of the voice service block 18 with the location of each call's downstream PCM data within said voice service block 18. PCM data comprises 8 bits per call per 125-microsecond frame. The NT's use this map to filter voice service information and match downstream PCM data to individual calls to particular locations within the NT's phone network, if the NT manages more than one phone extension. In a preferred embodiment, the LT sends this voice map once every millisecond, or once every 8 frames. Accordingly, the LT does not change the mappings in the voice block 18 in frames in which it does not broadcast a new voice map.

The LT transmits ATM cells with no changes or wrappings. The NT's filter ATM cells in the ATM service block (16) using the ATM header itself. The LT assigns each virtual path address to one NT, using methods known to those skilled in the art, and the NT's read the virtual path address. ATM cells are of a fixed length, allowing the NT's to easily delineate them. In a preferred embodiment ATM cells are never fragmented; only whole ATM cells are transmitted.

In a preferred embodiment the LT prepends a PPP header to every IP packet. The PPP header, as is known to those skilled in the art, contains the address of the NT to whom the packet is intended, as well as the length of the packet. The NT's use this information to filter and delineate IP packets in the IP service block (14). If an IP packet does not fit into the IP packet service block, the LT fragments it according to methods known to those skilled in the art, and broadcasts each fragment with its own PPP header, in a separate frame.

In each downstream frame 1, the LT broadcasts a PLOAM block (20) containing grants which allocate time slots (30) within the next upstream frame (28) to particular NT's, for transmission of particular services. With the exception of voice, each slot (30) can only be allocated to one NT. Each slot (30) can only be allocated for the transmission of a single service type. The size of these slots (30) can be configured when the LT is initialized, and is constant after that. In the preferred embodiment the slot size is 67 bytes. The LT allocates a series of consecutive slots (50) to each NT, for transmission of each service type. For the purposes of this invention, the series of consecutive slots (50) will be referred to as an upstream block.

The LT allocates voice as follows. It allocates a series of consecutive slots (60) to the upstream transport of voice service for all of the NT's. For the purposes of this invention this series of slots (60) will be referred to as an upstream voice block. Within this series of consecutive slots, the LT allocates each NT a portion of bandwidth (62) sufficient to transmit its voice service information, which in the preferred embodiment is 8 bits of PCM data per call per frame. The individual bandwidths (62) allocated to each NT for voice transport need not be bordered by frame borders. If any individual bandwidth (62) does start or end on a frame border this is purely coincidental, with the exception of the first bandwidth, which starts at the start of the first slot in the series. At a configurable interval, the LT allocates bandwidth for each NT to send it its queue length for each service type. This LT allocates this bandwidth as part of the bandwidth (62) it allocates to the same NT for voice service transport, the bandwidth for transmitting queue length being the end of the bandwidth (62) for voice service transport. In a preferred embodiment the LT allocates said bandwidth for each NT to send its queue lengths once every millisecond, or once every 8 frames.

Within the bandwidth (62) allocated to a given NT for voice transport, at the very start of the bandwidth, the NT transmits a 3-byte header (32), whose value is fixed and whose role is to prevent collision between the transmissions of consecutive NT's, and to synchronize between the NT and the LT. For services other than voice, a given NT transmits the same 3-byte header (32) at the start of the upstream block (50) allocated to it for transmission of a given service type, within the bandwidth of the first slot.

The NT's transmit upstream management information as a management service type, comprising management messages of the same format as those sent downstream. In a preferred embodiment the NT's never fragment management messages to fit them into slots; only a whole number of management messages are transmitted by each NT each upstream frame (28). In the preferred embodiment of the present invention an NT fills with empty bits the remainder of its upstream management service block (50*b*). The NT's send out management messages when necessary. The NT's send upstream management messages in order to report their maintenance statues to the LT; to acknowledge reception of downstream management messages, to send initialization information to the LT when an NT is added to the network; and to inform the LT when an NT is removed from the network.

In a general aspect of the preferred invention each NT regularly sends a management message containing a map of the bandwidth (62) allocated to it for voice service transport within the upstream voice block (60), with the location of each call's upstream PCM data within said bandwidth (62). The LT use this map to match upstream PCM data to individual calls from particular locations within the NT's phone network, if the NT manages more than one phone extension. In a preferred embodiment, each NT sends this voice map once every millisecond, or once every 8 frames. Accordingly, the NT does not change the mappings in its voice bandwidth (62) in frames in which it does not broadcast a new voice map.

The NT's send ATM cells with no changes or wrappings. In a preferred embodiment NT's do not fragment ATM cells; only a whole number of ATM cells are transmitted by each NT each upstream frame (28). In a preferred embodiment each NT fills the remainder of its upstream ATM service block (50c) with empty bits. As the slot size is configurable, the slot size can be configured to match the size of an ATM cell, minimizing wasted bandwidth.

In a preferred embodiment the NT's prepend a PPP header to IP packets, where the PPP header contains addressing and length information as in the downstream frames. If an NT cannot fit an entire IP packet into its upstream IP service block (50a), it fragments the IP packet according to methods known to those skilled in the art, and sends each fragment in its upstream IP service block (50a) of a different upstream frame (28).

What we claim is:

1. A method for transporting data services natively over a passive optical network (PON), comprising:
    forming a downstream frame having a fixed length, wherein the downstream frame includes at least a fixed length physical layer operations, administration, and management (PLOAM) block, the downstream frame is dynamically divided into variable size data blocks;
    natively encapsulating data of data services in the variable size data blocks of the downstream frame; and
    broadcasting the downstream frame by a line terminal (LT) to network terminals (NTs) of the PON, wherein the natively encapsulating realizes the transport of data services according to their original service type without conversion into a single service type.

2. The method of claim 1, wherein the data services include at least one of:
    management, voice, and Internet protocol (IP).

3. The method of claim 2,
    including in a single block of the variable size data blocks data of a data service of a particular type; and
    prefixing a block header to each variable size data block.

4. The method of claim 3, wherein the block header comprises at least one of:
    a type of service of the block, a length of the block, and error-checking information.

5. The method of claim 4, wherein the length of each block is dynamically set by the LT according to priorities of a particular service type and amount of incoming data for each data service.

6. The method of claim 1, wherein the management data service comprises messages for at least one of: distributing and changing encryption keys; notifying the NTs of a status of the LT; notifying the NTs on an ability to broadcast service information; synchronizing the NTs with the LT; assigning logical addresses to NTs initialized on the PON, filtering of downstream service; error-checking, and performing data integrity.

7. The method of claim 1, wherein the PLOAM block includes at least synchronization information, error-checking information, and a grants map.

8. The method of claim 7, wherein each grant in the grants map allocates an upstream timeslot to a particular NT for transmission of a particular service type in an upstream direction.

9. The method of claim 8, wherein the PLOAM is read by each NT receiving the broadcast downstream frame, and wherein the encapsulated data services information is read by an NT to which the encapsulated data services information is addressed to.

10. The method of claim 7, further comprising:
    forming an upstream frame by dividing time allocated for upstream transmission into fixed length slots;
    allocating a variable number of consecutive slots in the upstream frame for one or more NTs according to the grants map; and
    by each NT, inserting all information of a particular service in consecutive slots allocated for the NT.

11. The method of claim 10, wherein each NT reports to the LT a length of a queue awaiting upstream transport for each service type, wherein the queue length being used by the LT to dynamically allocate upstream grants in a PLOAM block.

12. The method of claim 1, wherein broadcasting the downstream frame further comprising:
    encrypting the downstream frame.

13. The method of claim 1, wherein a length of the downstream frame is 125microsecond.

14. A method for transporting data services natively over a passive optical network (PON), comprising:
    forming an upstream frame by dividing time allocated for upstream transmission into fixed length slots;
    allocating a variable number of consecutive slots in the upstream frame for each network terminal (NT) of the PON according to a grants map;
    by each NT, dividing the consecutive slots allocated for the NT to a variable number of native blocks having a variable block size;
    inserting information of a particular service type of a data service in a single block; and
    wherein the native blocks realize the transport of data services according to their original service type without conversion into a single service type.

15. The method of claim 14, wherein the grants map is included in a downstream frame sent from a line terminal (LT) of the PON.

16. The method of claim 14, wherein each sequence of consecutive slots allocated to an NT starts with a slot header, wherein the slot header allows to prevent collisions and to synchronize between the LT and the NT.

17. The method of claim 14, wherein each block starts with a header.

18. The method of claim 17, wherein the header comprises at least one of: a type of service, a length of the block, and error-checking information.

19. The method of claim 18, wherein the length of each block is variable and dynamically set by the NT according to priorities of the particular service type and amount of incoming data for each data service.

20. The method of claim 19, wherein the type of service comprises at least one of: management, voice, and Internet protocol (IP).

21. The method of claim 20, wherein the management service type comprises upstream management information, wherein the management information includes at least one of: a map for matching upstream voice time slots to particular calls, within the upstream slots allocated by the LT; and acknowledging reception of the management information received from the LT;
    reporting on status and ability of the NT to transmit service information; reporting that an NT has been removed from the PON.

* * * * *